(12) United States Patent
Furumochi

(10) Patent No.: US 7,783,191 B2
(45) Date of Patent: Aug. 24, 2010

(54) DIGITAL CAMERA

(75) Inventor: Hiroyuki Furumochi, Tokyo (JP)

(73) Assignee: Hoya Corporation, Tokyo (JP)

( * ) Notice: Subject to any disclaimer, the term of this patent is extended or adjusted under 35 U.S.C. 154(b) by 397 days.

(21) Appl. No.: 11/836,928

(22) Filed: Aug. 10, 2007

(65) Prior Publication Data

US 2008/0175582 A1 Jul. 24, 2008

(30) Foreign Application Priority Data

Aug. 10, 2006 (JP) ............................. 2006-218831

(51) Int. Cl.
*G03B 17/00* (2006.01)
(52) U.S. Cl. .................... 396/263; 348/221.1
(58) Field of Classification Search .............. 348/221.1; 396/263
See application file for complete search history.

(56) References Cited

U.S. PATENT DOCUMENTS

| | | | | |
|---|---|---|---|---|
| 4,714,963 | A | * | 12/1987 | Vogel ...................... 348/220.1 |
| 4,837,628 | A | * | 6/1989 | Sasaki ..................... 348/220.1 |
| 6,144,407 | A | * | 11/2000 | Mizutani et al. ......... 348/220.1 |
| 6,292,220 | B1 | * | 9/2001 | Ogawa et al. ............... 348/312 |
| 2005/0243179 | A1 | | 11/2005 | Yokonuma |

FOREIGN PATENT DOCUMENTS

JP   2003-348433   12/2003

OTHER PUBLICATIONS

English language Abstract of JP 2003-348433, (published on Dec. 5, 2003).
U.S. Appl. No. 11/836,909 to Furumochi, which was filed on Aug. 10, 2007.

* cited by examiner

*Primary Examiner*—W. B. Perkey
*Assistant Examiner*—Fang-Chi Chang
(74) *Attorney, Agent, or Firm*—Greenblum & Bernstein, P.L.C.

(57) ABSTRACT

A digital camera has an image sensor, a photographing processor, a driving signal controller, and a timing adjuster. The image sensor driver drives an image sensor by outputting a driving signal corresponding to a moving image. The photographing processor carries out an exposure in accordance with the operation of a release button, to record a still image. The driving signal controller outputs a control signal associated with a change of the driving signal to the image sensor driver in accordance with the recording operation and an output timing of the control signal. The image sensor driver outputs the driving signal corresponding to a still image in accordance with an update timing that synchronizes with the clock pulse signal. The timing adjuster shifts at least one of the output timing of the control signal and the update timing of the driving signal, from a synchronization timing of the clock pulse signal, in accordance with the operation.

5 Claims, 3 Drawing Sheets

DIGITAL CAMERA

BACKGROUND OF THE INVENTION

1. Field of the Invention

The present invention relates to a digital camera, electronic equipment with a photographing function, and so on. In particular, it relates to the release time lag in a photographing operation.

2. Description of the Related Art

In a digital camera, such as a compact type camera, a release time lag that is the time period from the depression of the release button to the start of the recording process (i.e., the beginning of the exposure of an image object to an image sensor such as a CCD), is generally longer than that of a film camera. This release time lag makes the total time of the recording process long, so that a blur occasionally occurs on the recorded image. To shorten the release time lag, for example, a photographing mode suitable for the still image is set in advance.

However, when the release button is fully depressed to record a still image, various processes, including a control of the image sensor, need to be performed before starting the exposure of the image sensor. Shortening the release time lag without reducing the number of processes is difficult.

SUMMARY OF THE INVENTION

An object of the present invention is to provide a digital camera that is capable of shortening the release time lag.

A digital camera according to the present invention has an image sensor, a photographing processor, a driving signal controller, and a timing adjuster. The image sensor driver drives an image sensor by outputting a driving signal corresponding to a moving image. The driving signal includes clock pulse signal that is used to successively read image-pixel signals from the image sensor. When a release button is operated to record a still image, the photographing processor carries out an exposure in accordance with the operation of the release button. The driving signal controller outputs a control signal associated with the change of the driving signal to the image sensor driver in accordance with the operation. The output timing of the control signal synchronizes with the clock pulse signal. The image sensor driver outputs a driving signal corresponding to a still image in accordance with an update timing that synchronizes with the clock pulse signal. Then, the timing adjuster shifts at least one of the output timing of the control signals and the update timing of the driving signal from the synchronization timing of the clock pulse signal, in accordance with the operation.

A computer readable medium that stores a program for photographing a subject according to another aspect of the present invention has a driving signal control code segment, and a timing adjusting code segment. The driving signal control code segment outputs a control signal associated with the change of a driving signal, to an image sensor driver in accordance with the operation of a recording member. The output timing of the control signal synchronizes with clock pulse signal that is used for successively reading image-pixel signals. The image sensor driver outputs a driving signal corresponding to a still image in accordance with an update timing that synchronizes with the clock pulse signal. The timing adjusting code segment shifts at least one of the output timing of the control signal and the update timing of the driving signal from the synchronization timing of the clock pulse signal, in accordance with the operation.

A method for photographing a subject according to another aspect of the present, invention has a) outputting a control signal associated with the change of driving signal to an image sensor driver in accordance with the operation of a recording member, an output timing of the control signal synchronizing with clock pulse a signal that is used for successively reading image-pixel signals, the image sensor driver outputting a driving signal corresponding to a still image in accordance with an update timing that synchronizes with the clock pulse signal; and b) shifting at least one of the output timing of the control signal and the update timing of the driving signal from the synchronization timing of the clock, pulse signal, in accordance with the operation.

An apparatus for photographing a subject according to another aspect of the present invention has a driving signal controller and a timing adjuster. When a recording member such as a button or switch, which is operated to record a still image, the driving signal controller outputs a control signal associated with the change of a driving signal to an image sensor driver in accordance with the operation of the recording member. The output timing of the control signal synchronizes with a clock pulse signal that is used for successively reading image-pixel signals. The image sensor driver outputs a driving signal corresponding to a still image in accordance with an update timing that synchronizes with the clock pulse signal. The timing adjuster shifts at least one of the output timing of the control signal and the update timing of the driving signal from the synchronization timing of the clock pulse signal, in accordance with the operation.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiment of the present invention is described with reference to the attached drawings.

Figure 1:
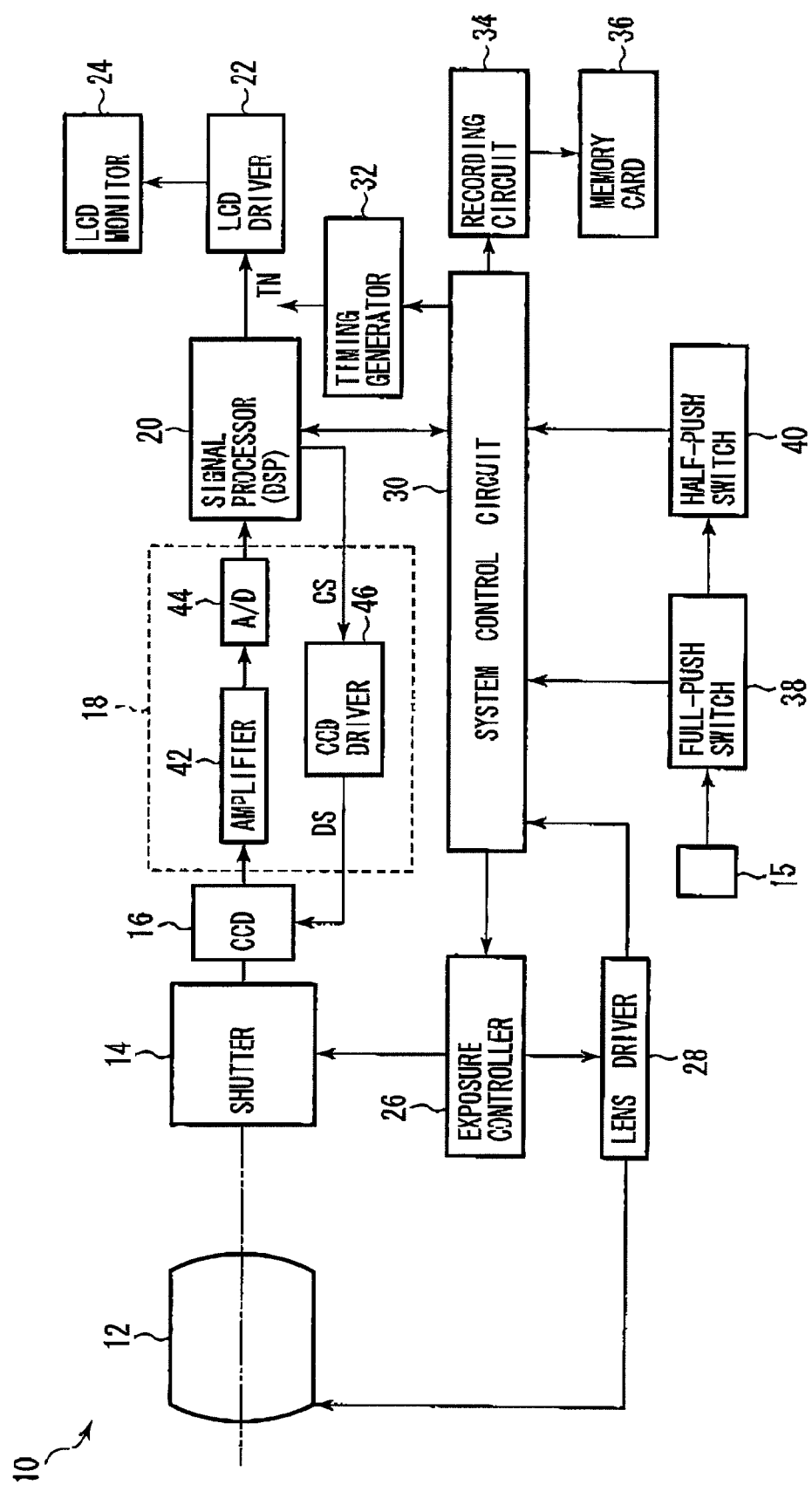
FIG. 1 is a block diagram of a digital camera according to the present embodiment.

FIG. 1 is a block diagram of a digital camera according to the present embodiment.

The digital camera 10 has a signal processor 20 and a system control circuit 30, and a memory card 36 is removably installed to the camera 10. The signal processor 20 controls an image signal process in the camera 10, and a program that controls the image signal process is stored in a memory (not shown) provided in the signal processor 20. The system control circuit 30, which includes a CPU, ROM, and RAM (not shown), controls various processes other than the image signal process, such as a photographing process. The system control circuit 30 detects the status of a mode dial (not shown) that is operated in order to set a photographing mode, and further detects the half-push status and full-push status of a release button 15 via a half-push switch 40 and a full-push switch 38.

When the normal photographing mode is selected, a signal process for displaying a moving-image as a preview image on the LCD monitor 24 is performed. An object image is formed on the light-receiving surface of the CCD 16 by light passing through a photographing optical system 12 and a shutter 14, so that analog image-pixel signals corresponding to the object image are generated in the CCD 16. The generated image-pixel signals are successively read from the CCD 16 at given constant intervals (for example, 1/60 seconds interval), and are fed to an AFE (Analog Front End) circuit 18. In the present embodiment, an on-chip color filter method using one color filter is applied.

The AFE circuit 18 is equipped with an amplifier 42, an A/D converter 44, and a CCD driver 46. The CCD driver 46 outputs driving signals to periodically read one field's worth of the image-pixel signals from the CCD 16. The CCD driver 46 has a plurality of registers that stores data associated with the driving signals. As described later, the data is updated, and the driving signals are updated in accordance with the updated data. The driving signals include clock pulse signals, charge sweeping signals, and sensor gate signals. The read image-pixel signals are amplified in the amplifier 42, converted to digital image signals by the A/D converter 44, and then input to the signal processor 20.

In the signal processor 20, various processes, such as a white balance and a gamma correcting process, are performed on the digital image signals. The processed image signals are temporarily stored in & frame memory (not shown), and are fed to an LCD driver 22. The LCD driver 22 drives the LCD monitor 40 on the basis of the image signals, so that a moving image is displayed on the LCD monitor 24. The signal processor 20, consisting of a DSP (Digital Signal Processor), controls the CCD driver 46 by outputting a sequence of control signals "CS" associated with the sequence of driving signals "DS" that is output from the CCD driver 46 to the CCD 16. The timing generator 32 outputs a sequence of standard clock pulse signals "TN" to each circuit. An output timing of the driving signal DS and the control signal CS is based on the standard clock pulse signals "TN".

When the release button 15 is depressed halfway, the half-push switch 40 is turned ON. Consequently, auto-focusing is performed, and an exposure value is calculated. A focusing lens (not shown) included in the photographing optical system 12 is driven by a lens driver 28 such that the image-forming surface coincides with the light-receiving surface of the CCD 16. The exposure controller 26 controls the shutter 14 and the lens driver 28.

When the release button 15 is depressed fully, the full-push switch 38 is turned ON, and a photographing process to record a still image is carried out. The signal processor 20 outputs control signals to the CCD driver 46. Based on the control signal for changing the driving signal, the CCD driver 46 changes the driving signal corresponding to moving image to a driving signal corresponding to a still image. The process of the CCD driver 46, namely the process of the AFE circuit 18, is updated on the basis of an update-timing, as described later. Next, the shutter 14 is opened for a given interval by control signals fed from the exposure controller 26. Consequently, one frame's worth of image-pixel signals corresponding to the still image are read from the CCD 16.

After the exposure process of the CCD 16 is carried out, as described later, the LCD driver 22 is stopped or suspended and the LCD monitor 24 is turned OFF. Next, the generated image-pixel signals are read from the CCD 16, and are subjected to various processes in the amplifier 42, the A/D converter 44, and the signal processor 20. Then, the image data is compressed in a recording circuit 34, and the compressed image data is stored into the memory card 36.

Figure 2:
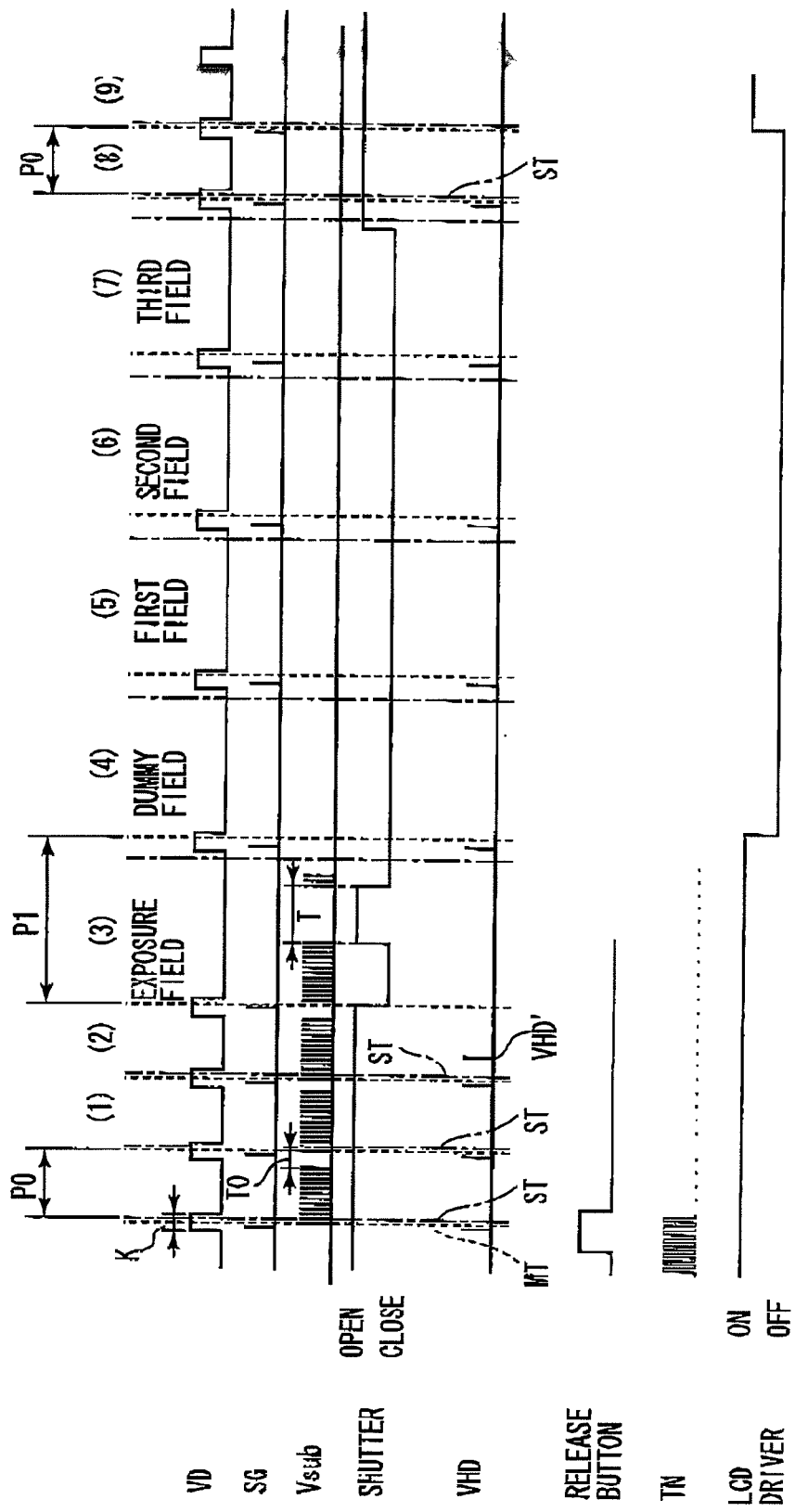
FIG. 2 is a timing chart of the photographing process.
Figure 3:
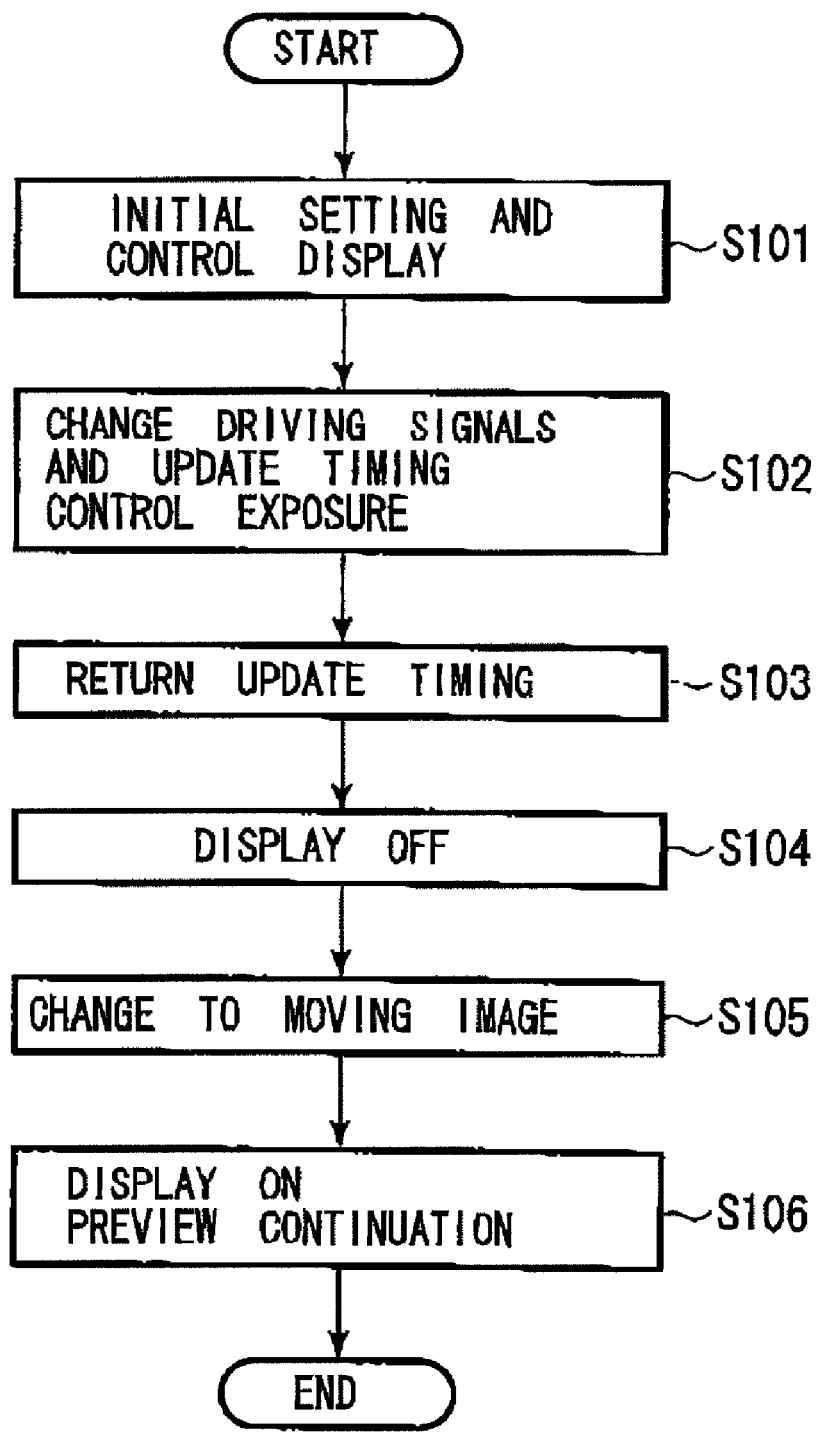
FIG. 3 is a flowchart of the photographing process performed by the signal processor.

FIG. 2 is a timing chart of the photographing process. FIG. 3 is a flowchart of the photographing process performed by the signal processor 20.

In FIG. 2, the clock pulse signal (vertical synchronizing signal), the charge sweeping signal, and the sensor gate signal, which are output from the CCD driver 46 to the CCD 16, are designated as "VD", "Vsub", and "SG", respectively. Also, the standard clock pulse signals output from the timing generator 32, designated as "TN", are shown in FIG. 2. While the moving image is displayed, the clock pulse signal VD is fed from the CCD driver 46 to the CCD 16 at given constant intervals. The period of the clock pulse signal VD is defined based on a one-field period. For example, the period is set to a value in a range of 30 ms to 40 ms.

Based on the driving signal DS including the signals "VD", "Vsub", and "SG", the CCD 16 functions as an electronic shutter so that charges accumulated in an exposure period "T0" are periodically transmitted to the AFE 18, namely, the image-pixel signals corresponding to the moving image are read from the CCD 16 in order. The output timing of this driving signal DS is adjusted in accordance with the control signal CS. The standard clock pulse signal TN has a sufficiently larger frequency compared with that of the clock pulse signal VD.

The sequence of control signals CS output from the signal processor 20 synchronizes with the clock pulse signal VD, in order to prevent noise occurring in the moving image while the preview or moving image is displayed. Concretely, the sequence of control signals CS is output within an output-period, which is the period from a pulse rise to a pulse drop. In FIG. 2, the output timing of the control signal CS is designated by a dash-dotted line "ST". The signal processor 20 acts periodically while synchronizing with an act-timing "MT" illustrated by a broken line "MT". Note that, the act-timing "MT" corresponds to one field's worth of effective image signals.

The update timing of the CCD driver 46 depends upon a sequence of update signals, which is designated by "VHD". The output of the update signal VHD represents an update timing that changes the driving signal DS output from the CCD driver 46 in accordance with a control signal CS that was previously fed from the signal processor 20. As shown in FIG. 2, the update signal VHD synchronizes with the clock pulse signal VD so as to be included in the output-period "K", and is located just before the output-timing "ST". When the CCD driver 46 receives the control signal CS in a given field period while the preview image is displayed, the changed or updated driving signal DS is output to the CCD 16 in the next field period. Therefore, when changing the driving signal DS on the basis of the control signal CS fed from the signal processor 20, the change or update of the driving signal DS is delayed by one-field period.

When the release button 15 is fully depressed, in Step S101, the recording process is started at the field period (1) shown in FIG. 2. In field period (1), initial processes such as a memory setting are carried out. Further, driving signals are output from the signal processor 20 to the LCD driver 22 so that a black monotone image is entirely displayed on the LCD monitor 24 during the field periods (1), (2), and (3).

In Step S102, the control signal CS is output during field period (2) to change the driving signal DS and the output timing of the update signal VHD. Namely, the control signal CS that changes the driving signals DS and the update signals VHD from corresponding to the moving image to that of corresponding to the still image, is output from the signal processor 20 in accordance with the output timing "ST". Concretely speaking, regarding the driving signal DS, the interval "P0" of neighboring clock pulses "VD" is changed to an interval "P1" for recording a still image, and the charge sweeping signal Vsub and the sensor gate signal SG are changed such that charges are accumulated over an exposure period "T".

Based on the standard clock pulse signal TN, the CCD driver 46 instantly receives the above control signal CS. Accordingly, the position of the update signal VHD is changed to the outside of the output-period "K" within field period (2). In FIG. 2, the changed update signal is designated as "VHD'". Further, In Step S102, exposure control processes such as the open-close of the shutter 14 are carried out and the output timing "ST" is changed.

Since the update timing (VHD') moves from inside of the output period "K" to a position just after the output timing "ST" in field period (2), the exposure process is carried out in the next field period (3) (herein, named as the "exposure field"). Namely, the driving signal DS is changed without a delay of one field period. In Step S103, the control signal that returns the update timing is output from the signal processor 20 to the CCD driver 46 in field period (3).

Field period (4), after the exposure time "T", which is the so-called "dummy field", is provided before the reading period of the image-pixel signals in order to stabilize the transform of accumulated charges. In Step S104, a control signal to stop the LCD driver 22 is output to the LCD driver 22 in the dummy field (4). Consequently, the action of the LCD driver 22 is suspended and the LCD monitor 24 is turned OFF. The time period taken for suspending the action of the LCD driver 22 is herein within a range of 30 ms to 50 ms. The charges accumulated in the CCD 16 are successively transferred to the AFE 18 over field periods (5), (6), and (7).

In Step S105, a control signal to change the driving signal is output from the signal processor 20 to the CCD driver 46; at field period (7). Thus, in field period (8), the period of the clock pulse signal VD is changed to the period "P0", corresponding to the moving image. Further, the output timing "ST" is changed so as to synchronize with the clock pulse signal VD.

In Step S106, a control signal to activate the LCD driver 22 again is output to the LCD driver 22 in field period (9). Consequently, the LCD driver 22 actuates the LCD monitor 24 and a moving image is displayed on the LCD monitor 24.

In this way, in the present embodiment, when the release button 15 is fully depressed and the photographing process is started, the control signal to change the driving signals and the update timing is output to the CCD driver 46 at the start time of field period (2). Then, in field period (2), the update signal VHD' rises outside of the output-period "K" of the clock pulse signal VD. Namely, the update timing is shifted to the outside of the synchronization timing of the clock pulse signal VD. While the moving image is displayed, the update signal VHD' cannot rise outside of the update-period "K" corresponding to an optical black period, since noise occurs on the moving image. However, in the field period (2), the update signals VHD' can rise outside since the moving image is not displayed (black image is displayed). Consequently, the exposure can be carried out in the next field period (3). In other words, the release time lag becomes short. The black image, which is displayed during field periods (1) to (3), is not affected by the changed update timing.

Also, in the present embodiment, when the photographing process is started, a control signal to stop the LCD driver 22 is output to the LCD driver 22 in the dummy field (4) after the exposure period "T". Since the LCD driver 22 is turned OFF before field period (5) (before the start of the reading of image-pixel signals), noise does not occur in the recorded still image. Further, the LCD driver 22 is not suspended before the start of the exposure for recording the still image. In other words, the suspending process is not carried out before the exposure period "T". The suspending process restricts processes performed by the signal processor 20. Concretely, the signal processor 20 cannot carry out various routines simultaneously when the suspending process is performed. Since the suspending process, which takes a relatively long time, is not carried out before the exposure period, the exposure can be carried out immediately after the release button 15 is fully depressed, which shortens the release time lag.

The stoppage of the LCD driver 22 may be carried out in the exposure field period (3) instead of the dummy field (4). Further, the output-timing, "ST" may be shifted to the outside of the output-period "K", instead of the update signal VHD.

Note that, either the suspension of the LCD driver 22 or the changing of the update timing may be solely carried out in the photographing process. The system control circuit may carry out the series of processes as described above instead of the signal processor.

A video camera, or electronic equipment with photographing function, such as a cellular phone, may be also applied. In this case, a member for recording a still image, such as a button, is operated.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2006-218831 (filed on Aug. 10, 2006), which is expressly incorporated herein by reference, in its entirety.

The invention claimed is:

1. A digital camera comprising:

an image sensor driver that drives an image sensor by outputting a driving signal corresponding to a moving image, the driving signal including a clock pulse signal that is used to successively read image-pixel signals from said image sensor;

a photographing processor that carries out an exposure in accordance with the operation of a release button, in order to record a still image;

a driving signal controller that outputs a control signal associated with a change of the driving signal to said image sensor driver in accordance with the operation, an output timing of the control signal synchronizing with the clock pulse signal, said image sensor driver outputting a driving signal corresponding to a still image in accordance with an update timing that synchronizes with the clock pulse signal; and a timing adjuster that shifts at least one of the output timing of the control signal and the update timing of the driving signal, from a synchronization timing of the clock pulse signal, in accordance with the operation, wherein:

the image sensor driver updates the driving signal in accordance with an update signal that rises in the image sensor driver, based on the control signal from the driving signal controller, while synchronizing with the clock pulse signal, the timing adjuster shifts an output timing of the update signal from the synchronization timing of the clock pulse signal so as to shorten an interval between the output timing of the control signal and the output timing of the update signal, and the image sensor driver outputs the driving signal of a still image from a next field interval in accordance with the shifted update signal.

2. The digital camera of claim 1, wherein said timing adjuster synchronizes the update timing with the clock pulse signal again, after shifting the update timing.

3. The digital camera of claim 1, wherein said timing adjuster outputs a control signal for shifting the update timing to said image sensor driver with the control signal associated with the driving signal.

4. The digital camera of claim 1, wherein the output timing of the control signal and the update timing of the driving signal are within an output period of the clock pulse signal of before the operation of the release button.

5. A method for photographing a subject comprising:
outputting a control signal associated with the change of a driving signal to an image sensor driver in accordance with the operation of a recording member, an output timing of the control signal synchronizing with a clock pulse signal used for successively reading image-pixel signals successively, said image sensor driver outputting a driving signal corresponding to a still image in accordance with an update timing that synchronizes with the clock pulse signal; and updating the driving signal in accordance with an update signal that rises in the image sensor driver, based on the control signal, while synchronizing the clock pulse signal;

shifting at least one of the output timing of the control signal and the update timing of the driving signal from a synchronization timing of the clock pulse signal, in accordance with the operation;

shifting an output timing of the update signal from the synchronization timing of the clock pulse signal so as to shorten an interval between the output timing of the control signal and the output timing of the update signal; and outputting the driving signal of a still image from a next field interval in accordance with the shifted update signal.

* * * * *